United States Patent [19]

Prior et al.

[11] Patent Number: 4,504,555

[45] Date of Patent: Mar. 12, 1985

[54] COMPOSITION AND PROCESS FOR FORMING INORGANIC RESINS AND RESULTING PRODUCT

[75] Inventors: William L. Prior, Newark; William C. Sargeant, Bolivar, both of Ohio

[73] Assignee: Masonite Corporation, Chicago, Ill.

[21] Appl. No.: 415,314

[22] Filed: Sep. 7, 1982

[51] Int. Cl.$^3$ .......................... B28B 1/16; C04B 9/04
[52] U.S. Cl. ...................... 428/689; 106/85; 264/42; 264/46.4; 264/256; 264/333; 501/109; 501/111
[58] Field of Search ............... 264/46.4, 42, 333, 256; 106/85; 501/109, 111

[56] References Cited

U.S. PATENT DOCUMENTS

| | | | |
|---|---|---|---|
| 3,320,077 | 5/1967 | Prior | 106/105 |
| 3,752,684 | 8/1973 | Kiehl et al. | 106/58 |
| 3,923,534 | 12/1975 | Cassidy | 106/62 |
| 3,991,254 | 11/1976 | Takeuchi | 106/62 X |
| 4,141,744 | 2/1979 | Prior et al. | 106/105 |
| 4,226,626 | 10/1980 | Toeniskoetter et al. | 106/85 X |
| 4,315,967 | 2/1982 | Prior et al. | 106/106 X |
| 4,324,592 | 4/1982 | Patel et al. | 106/85 |
| 4,394,174 | 7/1983 | Tomic | 106/85 |
| 4,432,799 | 2/1984 | Salazar | 106/85 |
| 4,440,865 | 4/1984 | Salazar | 106/85 X |

*Primary Examiner*—Philip Anderson
*Attorney, Agent, or Firm*—Mason, Kolehmainen, Rathburn & Wyss

[57] ABSTRACT

Compositions and processes for forming inorganic resins, including articles of manufacture incorporating these resins are disclosed. The inorganic resins are characterized by their strength, nonflammability, dimensional stability, resistance to organic and inorganic chemicals, to heat and to abrasion and their adaptability to being formed into non-cellular or cellular forms. The resins are formed by reacting a liquid component A containing a mono aluminum or mono magnesium phosphate and a liquid component B containing a magnesium oxide and/or a wollastonite and a dispersing agent. Various fillers may be incorporated and a blowing agent may be added to form a cellular resin.

61 Claims, No Drawings

COMPOSITION AND PROCESS FOR FORMING INORGANIC RESINS AND RESULTING PRODUCT

BACKGROUND OF THE INVENTION

A. Field of the Invention

This invention relates to inorganic resins and to compositions and processes for forming them and articles of manufacture including such inorganic resins disposed on a support surface and, more particularly, to inorganic resin cements having a unique combination of properties and a wide range of uses. The inorganic resin cements of the present invention may be formed as noncellular or cellular structures.

B. Prior Art

A number of inorganic resin cement systems are known. Some are formed of magnesium oxychlorides or magnesium oxysulfates (U.S. Pat. Nos. 3,320,077; 4,141,744; and 4,315,967); and others are formed using phosphates and magnesia. Exemplary of this latter type are compositions of an acid magnesium phosphate, nagnesia, silica, mineral fibers and water in an amount from 70 to 140% of the weight of the remaining components (U.S. Pat. No. 3,752,684); compositions in which a low reactivity magnesia is reacted with an acid aluminum phosphate complex containing an anion of a mineral acid (other than an oxyphosphorus acid) or of a carboxylic acid (U.S. Pat. No. 3,923,534); and compositions formed of a solution of an acid and aluminum phosphate (e.g., Al(PO$_4$)$_3$) slurried with silica, alumina and magnesia (U.S. Pat. No. 3,991,254). The insulating materials of U.S. Pat. No. 3,752,684 require the removal of large amounts of water at elevated temperatures; the cold setting refractory materials of U.S. Pat. No. 3,923,534 require extended periods (e.g., 6–8 hours) to set and the slurries used to form the insulating structures of U.S. Pat. No. 3,991,254 must be fired at 500° C. or above. Finally, mono-ammonium and diammonium phosphates have been reacted with deadburned magnesium oxide. These compositions have a number of inherent disadvantages, among which are intense ammonia odor, and the formation on top of the resulting cements of a phosphate solution residue. Generally, such prior art inorganic resin systems using phosphates and magnesia have been of a character which has limited their uses to such applications as refractory linings, thermal insulation and use in preparing fast-setting, bonded aggregate structures as replacements for cements and mortars.

SUMMARY OF THE INVENTION

The inorganic resins of the present invention can replace at least a portion of the presently known organic resins in a wide range of applications, for example molded configurations (in cellular and noncellular structures); thermal, electrical and/or acoustical insulations; binders and adhesives; coatings and or surfacing agents; patching compositions; man-made boards including organic, e.g., cellulosic, fibers and/or inorganic fibers such as fiberglass and the like. The resins can be deposited on a fiberglass mat support surface to impregnate at least an upper surface of the mat to form a fiberglass reinforced article. The resins can also be deposited on a fiberboard support surface to adhere the resin to the fiberboard to form a composite article. The inorganic resins of the present invention are formed by an exothermic reaction between a mono aluminum phosphate or a mono magnesium phosphate, or mixtures, with wollastonite or magnesium oxide or mixtures. The rapid exothermic reaction drives off any water in the liquid reaction mixture without the use of externally applied heat. Further, the use of relatively inexpensive materials compared to typically organic resins offers a number of advantages over many of the organic resins destined for similar applications. The inorganic resins of the present invention can be formulated to be essentially nonflammable, strong and resistant to water and most chemicals including acids, alkalies and organic solvents.

It is therefore an object of the present invention to provide a two-component system for forming improved inorganic resin cements. Another object of the present invention is to provide a two-component liquid system such that when the two components remain separated, they have an extended shelf life of months or years, but when the two components are mixed, they begin to react exothermically to form an inorganic resin capable of being applied to a wide variety of support surfaces and can be cast or molded into various structures, e.g., piping, ductwork, paneling, and the like.

A further object of the present invention is to provide a unique resin in cellular or noncellular form having good electrical, thermal and acoustical insulative properties, and is essentially nonflammable, nonsmoking and odor free. Another object of the present invention is to provide a new and unexpected inorganic resin cement having unexpected strength, resistance to elevated temperatures, chemicals, water, ultra-violet radiation exposure while being machinable and nonfriable, and resistant to abrasion and abrupt temperature changes.

A still further object of the present invention is to provide a two-component liquid system for forming improved inorganic resin cements. When the two liquid components of the present invention are mixed, the two components react exothermically to form the resin without the need for any externally supplied heat to remove water or to effect final curing. The time period over which the resin forming composition remains liquified, the set-up time, the foaming time, and the foam set time for cellular resins using a blowing agent may be controlled and predetermined.

These and other objects and advantages of the present invention will be apparent from the following detailed description of the invention.

DETAILED DESCRIPTION OF THE PRESENT INVENTION

According to one important feature of the present invention, the resin composition of the present invention is provided in two physically separated components maintained separate until immediately prior to forming the inorganic resin. A first inorganic resin component, hereinafter referred to as component A, is a liquid comprising an aqueous solution of mono aluminum phosphate, mono magnesium phosphate or a mixture thereof having a viscosity ranging between about 700 and about 10,000 centipoises. A second component, hereinafter referred to as component B, is a liquid comprising an aqueous vehicle, a phosphate-reactive constituent selected from reactive wollastonite, magnesium oxide or mixtures thereof having a relatively low surface area, e.g. dead-burned magnesium oxide having a surface area of about 0.75 m$^2$/gm, and a non-reactive dispersing agent. Component B should have a viscosity permitting it to be rapidly and thoroughly mixed with component A, thereby to form a slurry and to react exothermically to form an inorganic resin.

In accordance with another important feature of the present invention, an unreactive low-water demand filler, e.g., silica, milled fibers or a preformed cellular material, can be added to component A. Wollastonite also may be added to component A to give the resin added resistance to cracking. The resin may be made in cellular form by adding a blowing agent, preferably calcium carbonate, to component B and a surfactant to either or both components.

In accordance with another important feature of the present invention, the two liquid components A and B are mixed to form a reactive inorganic resin cement mixture immediately prior to applying the resin mixture onto a resin cement support surface. Component B should have a viscosity permitting it to be rapidly and thoroughly mixed with component A, for example about 700 to about 10,000 centipoises, and components A and are mixed B to form a slurry which react exothermically to set up as an inorganic resin. Set up times, once the two liquid components are mixed, range from 30 seconds to several minutes. The two liquid components can be mixed in a continuous mixing head to form the resin cement mixtures as the mixture is sprayed from the mixing head toward a resin cement support surface. The resin cement support surface can be any surface capable of supporting the resin cement surface during set-up, for example, a fiberglass mat or a rigid mold. The two liquid components form a reactive slurry and the reaction begins upon mixing and continues exothermically during set-up and curing driving away any water in the mixture without the need for any externally applied heat. The resin is completely cured without any externally applied heat within a period ranging from several hours to several days.

In accordance with one important embodiment of the present invention, the inorganic resin cement of the present invention is formed by the reaction upon mixing of a liquid component A comprising an aqueous solution of mono aluminum phosphate, mono magnesium phosphate or a mixture thereof with a liquid component B comprising a non-reactive dispersing agent and a phosphate-reactive constituent. The phosphate reactive constituent can be reactive wollastonite, defined herein as wollastonite having an aspect ratio less than about 10:1; magnesium oxide having a relatively low surface area for example, dead-burned magnesium oxide or any other magnesium oxide having a surface area in the range of about 0.1 m²/gm to about 5 m²/gm; or mixtures thereof. The inorganic resin formed by reaction between components A and B are characterized by good strength; nonflammability; resistance to heat, chemicals, including water, and ultra-violet radiation; and by its adaptability to being formed into structural configurations. The resin of the present invention may also include fillers such as silica, milled fibers, preformed cellular materials, and the like as well as non-reactive wollastonite, defined as wollastonite having as aspect ratio of at least 15:1. These additives contribute to the various desired properties of the resin. Finally, the resins may be cellular in form, the preferred size of the cells ranging from ultrafine to medium.

The inorganic resins of this invention are formed by providing two separate liquid components capable of extended shelf life when separated and immediate reaction which when mixed to form the resin. The reaction is exothermic and no additional heat is required to accomplish resin set-up and final cure. The quantity of water in the mixture of components should be maintained at a low level e.g. less than 40% by total weight of the mixture, and preferably less than 25% of the total mixture weight to minimize the amount which must be removed during curing. In accordance with another important feature of the present invention, the total water in the mixture is less than 30% by total weight of the combination of components A and B to increase resin stability and integrity while permitting set-up times ranging from as little as 30 seconds to several (e.g., 15) minutes and cure times of the order of a few hours to a few days. The resins may be formed with or without cells and include a unique combination of properties including high strength; good thermal, electrical and acoustical insulative properties; chemical and moisture resistance; nonflammability and nonsmoking. The structure of the cellular forms may be varied to provide materials of varying densities.

Liquid component A comprises mono aluminum phosphate $(Al(H_2PO_4)_3)$ or mono magnesium phosphate $(Mg(H_2PO_4)_2)$ or a mixture thereof in the form of an aqueous solution. Liquid component B comprises an essentially non-reactive dispersing agent and a phosphate-reactive constituent, which is a reactive wollastonite (acicular calcium metasilicate), a finely divided dead-burned magnesium oxide with a relatively low surface area, or a mixture thereof.

The viscosities of these two liquid components should range between about 700 and about 10,000 centipoises at 25° C. and they should be essentially matched, i.e. ±25% in viscosities, to permit rapid, thorough mixing of the components. The ensuing reaction upon mixing is exothermic and rapid. The liquid times, set-up times, and foaming times, as well as the physical properties and physical forms of the resin can be predetermined through the addition of various constituents to the two components. This will be made apparent from the following detailed description of the two liquid components and the examples.

To achieve the full advantage of the present invention the amount of water in each components A and B should be minimized, provided the two components are pourable, and easily mixable liquids. Excess waer e.g. more than about 40% based on the total weight of components A and B may result in shrinking and cracking, steam explosion, and/or bond rupturing in the resins during setting and curing as well as during any subsequent use of the resins at elevated temperatures. The exothermic reaction of components A and B provides a controlled source of energy sufficient to remove any water from the mixture while maintaining the structure of the resin. Resin configurations, e.g., sheets, bricks, panels, molded and extruded structures and the like can be formed within minutes without any additional energy input. These configurations exhibit good dimensional stability, remaining essentially unchanged during their subsequent use.

In accordance with another new and unexpected embodiment of the present invention, reactive wollastonite and magnesium oxide are both included in component B. It has been found in accordance with the present invention that wollastonite (reactive) reacts rapidly with mono magnesium phosphate and/or mono aluminum phosphate to form an inorganic resin cement while being relatively non-reactive with phosphoric acid or other acid phosphate salts. This unexpected reaction between wollastonite and mono aluminum phosphate or mono magnesium phosphate permits the use of 0+ to 100-% reactive wollastonite as the phosphate reactive constituent in component B, the remainder of the phosphate reactive constituent being magnesium oxide.

COMPONENT A

The mono aluminum phosphate and mono magnesium phosphate of component A are preferably supplied in the form of clear syrupy aqueous solutions, the water in the solutions providing the liquid vehicle for component A to achieve a viscosity in the range of 700 to 10,000 centipoises at 25° C.

Exemplary of a suitable mono aluminum phosphate solution is one analyzing 8% $Al_2O_3$ and 33.7% $P_2O_5$, (solids concentration of 50 weight %) and having a specific gravity of 1.47, a pH of 1.0 and a Baume value of 47.5°. Exemplary of a suitable mono magnesium phosphate solution is one analyzing 5.3% MgO and 32.6% $P_2O_5$, (solids concentration of 44 weight %) and having a specific gravity of 1.38, a pH of 1.2 (1% solution) and a Baume value of 42.9°. The amount of aqueous mono aluminum phosphate and/or mono magnesium phosphate solution in component A should range between about 20% and about 70% by weight of the total weight of components A and B, when mixed. The amount of phosphate constituent (solid basis) should range between about 10% and 35% by total weight of components A and B.

Generally, the use of mono aluminum phosphate is preferred over mono magnesium phosphate for forming cellular resins when a chemical blowing agent is used since the resulting resins exhibit somewhat better high-temperature resistance. On the other hand, mono magnesium phosphate generally forms resins having greater strength. A mixture of the two phosphate constituents provides resins having a desired combination of strength and high-temperature resistance.

In accordance with another important feature of the present invention, one or more inert, low water-demand fillers may be added to component A to form inorganic resins having various physical characteristics. To achieve the full advantage of the present invention, the fillers should require no more than about 30 cc water to make a flowable paste of 100 gm of filler. Exemplary of suitable fillers are silica (minus 325-mesh), mineral or glass milled fibers, powdered glass, glass beads, flint, titania, some clays, barytes and the like, as well as mixtures of these. The filler may be present in an amount up to about 50% by weight of the total weight of components A and B, the amount being determined by such factors as water demand, component viscosity required, and physical characteristics desired of the final inorganic resins.

It if it is desired to form a syntactic cellular structure, i.e., one incorporating preformed cellular fillers, then such fillers may be added to component A. A number of different types of such preformed cellular fillers are available, including glass; ceramic or synthetic organic resin bubbles; vermiculite; and the like. The cellular filler also should not require more than about 30 cc water to make a flowable paste of 100 gm of filler. The amount of cellular filler to be added will depend upon the cellular structure desired in the final resin and may depend upon the final viscosity of component A needed for compatibility with component B. The total amount of all types of fillers added may be up to about 50% by weight of the total weight of components A and B.

In accordance with another important embodiment of the present invention, in some resin formulations, particularly those having a cellular structure formed by a blowing or foaming agent, wollastonite in a form which is substantially unreactive is added to the mono aluminum phosphate and/or mono magnesium phosphate of component A. A typical less reactive form of wollastonite useful in accordance with this embodiment of the present invention is a finely divided acicular material having an aspect ratio of at least about 15 to 1 and a surface area of less than about 1.0 $m^2/gm$. It is a naturally occurring mineral which is essentially pure calcuim metasilicate, $CaSiO_3$, having a molecular weight of 116. Surprisingly, the addition of the less reactive wollastonite to component A reduces cracks and shrinkage in the inorganic resins formed. The less reactive wollastonite, when added to component A in accordance with this embodiment of the present invention, is added in an amount up to about 10% by total weight of components A and B. To achieve the full advantage of this embodiment of the present invention, the less reactive wollastonite is added to component A in an amount up to about 5% by total weight of components A and B. To achieve an exceptionally long storage life of Component A, the less reactive wollastonite fibers of component A should be added shortly before components A and B are mixed to prevent any premature reaction of the wollastonite fibers with the mono aluminum or mono magnesium phosphate, since even the less reactive wollastonite, as defined herein, reacts with the phosphate.

The liquid component A should include a water-repellant surfactant in an amount of about 0.2% o about 5% by total weight of components A and B when a blowing agent is included to form the inorganic resins in cellular form. This sufactant stabilizes the foam during formation and set-up and controls the cell size and density of the final cellular resin. To achieve the full advantage of this embodiment of the present invention, the surfactant should be a non-carbonizing surfactant, such as hydrophobic fumed silica, silicone or a titanate to prevent formation of carbon within the resin during set-up and curing. If carbonization can be tolerated, surfactants such as calcium, zinc or aluminum stearate may be used. A small amount of such water-repellent surfactants may be added to component A or B or both in formulating non-cellular structures as well as cellular structures in accordance with the present invention.

It may be desirable to control and predetermine the profile of water release from the resin of the present invention during cure and subsequent heating of the resins for particular resin uses. Water release can be controlled, in accordance with another important feature of the present invention, by replacing all or part of the inert, low water-demand filler, such as silica, with a chemically hydrated, water-releasing material, such as finely divided hydrated alumina, i.e. $Al_2O_3.3H_2O$. The use of such a water-releasing material is illustrated in example 13.

In formulating Component A, the water solution of the mono aluminum phosphate, mono magnesium phosphate or mixtures thereof, is prepared by adding water to the phosphate(s) to provide the predetermined concentration of phosphate reactant in water. This liquid is preferably maintained at a temperature around 15° C. (about 60° F.) to prevent overheating during component mixing.

The less reactive wollastonite, fillers and surfactants, if any, are added to the liquid and mixed to form a slurry ready for the mixing with component B.

COMPONENT B

Component B provides a phosphate-reactive constituent which may be wollastonite, magnesium oxide or a mixture thereof. The wollastonite of component B is distinguished from that added to component A in that it is of an acicular form having an aspect ratio of 10 or less. To achieve the full advantage of the present invention, the reactive wollastonite of component B should have an aspect ratio of less than 8 and, in particular, about 5 to 1. To achieve the full advantage of the present invention, the surface area of the reactive wollastonite should be at least 1.0 $m^2$/gm. and, in particular, at least 1.25 $m^2$/gm. A typical reactive wollastonite useful in accordance with the present invention has a surface area of about 1.55 $m^2$/gm. Like the wollastonite of component A it is essentially pure calcium metasilicate, but unlike the material with the much higher aspect ratio, it is highly reactive with the mono aluminum or mono magnesium phosphate constituent. In accordance with an important feature of the present invention, the use of at least some reactive wollastonite as the phosphate-reactive constituent minimizes cracks and shrinkage in the final resin. The amount of the reactive wollastonite in component B may be up to about 40% by weight of the total weight of components A and B.

The magnesium oxide used as the phosphate-reactive constituent can be considered to have a relatively low reactivity when compared with so-called reactive magnesium oxides having surface areas of at least 5 $m^2$/gm. In accordance with the present invention, the magnesium oxide should have a surface area of less than about 2.0 $m^2$/gm. To achieve the full advantage of the present invention, the magnesium oxide should have a surface area of 1.0 $m^2$/gm. or lower. A typical magnesium oxide useful in accordance with the present invention has a surface area of 0.75 $m^2$/gm. and is classified as high density, low reactivity magnesium oxide. The magnesium oxide should be finely ground and preferably is sized to pass a 325-mesh screen. The amount of this magnesium oxide in component B may be up to about 50% by weight of the total weight of components A and B. In general, the more magnesium oxide added the more reactive is the mixture and the shorter is the resin set time. In accordance with an important feature of the present invention, the addition of some magnesium oxide imparts added strength to the final resin.

When both wollastonite and magnesium oxide are used as the phosphate-reactive constituent in component B, the relative amounts of these reactants may extend over the entire range of from 0+ to 100-%. To achieve the full advantage of the present invention, the relative amounts of phosphate solution of component A to phosphate-reactive constituent of component B may range from about 50/50 (weight basis) to about 65/35. Particularly new and unexpected results are obtained when the weight ratio of phosphate solution to phosphate-reactive constituent is in the range of 55–60/-45–40. A typical ratio of phosphate to phosphate reactive constituent to achieve new and unexpected results is 58–42. This in turn means that the ratio of phosphate on a dry basis/phosphate reactive constituent may range from about 25/75 to about 35/65 with a typical ratio being 29/71.

In accordance with another important feature of the present invention, the dispersing agent is an aqueous phosphate dispersant selected from the group consisting of sodium hexametaphosphate, sodium tripolyphosphate, sodium acid pyrophosphate, trisodium phosphate and tripotassium phosphate. The dispersing agent should be essentially unreactive with the other resin components under the conditions of formulation and mixing. To achieve the full advantage of the present invention, when a noncellular resin is formed with mono aluminum phosphate in accordance with one embodiment of the present invention, the dispersing agent should be sodium tripolyphoshpate, sodium hexametaphosphate, sodium acid pyrophosphate or mixtures thereof. One or more of these dispersing agents when used with mono aluminum phosphate to form a noncellular resin provides resins with unexpectedly better strength than other non-reactive dispersing agents. The concentration of the dispersing agent in aqueous solution and the amount of such solution are chosen to effect the required dispersing action and to supply the liquid vehicle of component B to the desired viscosity. An optimum amount of this dispersing agent may be readily determined for any selected resin composition. As will be seen in example 11, when a chemical blowing agent such as calcium carbonate is used to form a cellular resin, then the dispersing agent must be chosen to maintain the pH of component B below about 10 to permit the release of carbon dioxide.

One or more inert, low water-demand fillers of the type added to component A, as described, also may be added to component B. If such an inert filler is incoporated in both components A and B, then the total quantity added may amount up to about 50% by total weight of components A and B.

In accordance with another important embodiment of the present invention, cellular structures can be formed by using a chemical blowing agent capable of producing a gas during the mixing of components A and B. The blowing agent is added to component B. The blowing agent should be one capable of releasing a gas either by reaction, decomposition or vaporization in the acid slurry formed when components A and B are mixed. Although it is possible to use other inorganic carbonates, e.g., sodium carbonate and sodium bicarbonate, to achieve the full advantage of the present invention, the chemical blowing agent should be calcium carbonate sized to pass a 325-mesh screen. By adjusting the amount of calcium carbonate, it is possible to form cellular inorganic resins having densities ranging from about 10 to about 50 pounds/cubic foot. In accordance with another important feature of the present invention, the amount of blowing agent added to component B may range from about 0.2% to about 15% by total weight of components A and B, and to achieve the full advantage of the present invention when a blowing agent is used, the amount of blowing agent should be in the range of about 0.5% to about 6% by total weight.

In accordance with another important feature of the present invention, when mono magnesium phosphate is used as the phosphate reactive constituent, dipotassium phosphate, tripotassium phosphate, tripolyphosphate, tetrapotassium phosphate or mixtures of said dispersing agents provide inorganic resin cements with new and unexpected strengths which are at least double the strengths achieved with other dispersing agents tested. These particular dispersing agents react with mono aluminum phosphate and therefore are not suitable in the formula where mono aluminum phosphate is at least 10% of the total weight of the phosphate reactive constituent.

Cellular resins also can be manufactured in accordance with the principles of the present invention by using an inert compressed gas, such as carbon dioxide or air as a physical blowing agent. The physical blowing agent may be introduced into the mixer as components A and B are mixed or bled into the front of a static mixer when a static mixer is used for mixing.

The water-repellant surfactant added to component A may be added into component B either in addition to or in place of that added to component A. The total quantity added to components A or B or both should not be more than about 5% by total component weight.

In formulating component B, the water solution of the dispersing agent provides the liquid vehicle and to it are added, with stirring, the phosphate-reactive constituent (wollastonite, and/or magnesium oxide) along with the blowing agent, if used, and any additional fillers and surfactants. Component B, like component A, is preferably cooled to about 15° C. prior to mixing. In accordance with another important feature of the present invention extended shelf life for component B can be achieved by formulating component B in dry form, and adding water prior to mixing components A and B.

Components A and B are mixed in any type of blender, mixer or mixing head suitable for rapidly and thoroughly blending two slurries of the viscosity range specified. Such mixers include those equipped with blades, continuous mixing heads and static mixers. The viscosity of the slurry mixture rises rapidly and sufficient heat is developed in the ensuing exothermic reaction to vaporize any excess water as steam. By choice of reactants, the time over which the mixture remains liquid may be varied between some 30 seconds to as much as about 10 minutes. Likewise, in forming cellular resins, the "foam rise" time may be adjusted and varied between about one minute and 5 minutes and the "foam set" time between about 1.5 and 10 minutes. As noted previously, the water-repellent surfactant stabilizes the cellular resin during foaming and settup, that is, it prevents cell collapse until the resin sets. Complete curing of the resin takes place at ambient temperature and requires a relative short time, e.g., from several hours to a few days.

The liquid mixture of components A and B may, prior to set-up, be formed into any desired configuration by molding, extruding, compression molding and the like. It may be sprayed onto surfaces, coated on surfaces by any suitable technique, and used to form cellular fillings in predefined spaces. Because of its nonflammability it is particularly suited for wall panelings; because of its resistance to chemicals and moisture it may be used in making pipes, ducts, and the like; and because of its high dielectric properties it may be formed into insulators, and the like. It will be appreciated that these are but a few exemplary uses for the unique inorganic resins of this invention.

The compositions, products and process of this invention may be further described with reference to the following examples which are meant to be illustrative and not limiting.

In the following examples the amounts of the various constituents are given in parts by weight. The two components were formulated separately in high speed blenders and then mixed or blended in a mechanical mixer. Components A and B were each at about 15.5° C. (60° F.) when mixing began. The mono aluminum phosphate is a water solution analyzed to contain 8% $Al_2O_3$ and 33.7% $P_2O_5$, (solids concentration of 50 weight %) 47.5° Baume; and the mono magnesium phosphate is a water solution analyzed to contain 5.3% MgO and 32.6% $P_2O_5$, (solids concentration of 44 weight %) 42.9° Baume. The silica filler was −325 mesh and the wollastonite of component A is an acicular material with an aspect ratio of about 20:1 and surface area of 0.88 $m^2$/gm. The reactive wollastonite of component B is an acicular material with an aspect ratio of about 5:1 and surface area of 1.55 $m^2$/gm; and the magnesium oxide is a high purity technical grade material processed from magnesium rich brine, −325-mesh and having a surface area of 0.75 $m^2$/gm.

EXAMPLE 1

| | |
|---|---|
| Component A | |
| Mono magnesium phosphate | 100 parts |
| Silica | 100 |
| Wollastonite | 15 |
| Component B | |
| Tripotassium phosphate - 50% solution | 25 |
| Magnesium oxide | 70 |
| Silicone (e.g. Dow Corning 772, Union Carbide 272) | 1 |

The resin has a modulus of rupture of 750 psi after two hours and 1470 psi after four days; a 12.6% weight loss and a specific gravity of 1.64 after four days.

EXAMPLE 2

| | |
|---|---|
| Component A | |
| Mono magnesium phosphate | 100 parts |
| Silica | 100 |
| Component B | |
| Tripotassium phosphate - 50% solution | 35 |
| Wollastonite | 49 |
| Magnesium oxide | 21 |
| Silicone | 1 |

This resin has a modulus of rupture of 700 psi after four days.

EXAMPLE 3

Example 2 was repeated using the same component A but changing the ratio of wollastonite to magnesium oxide in component B from 70/30 of Example 2 to 10/90. The effect of the magnesium oxide on resin strength was shown by the fact that the resin of this example has a modulus of rupture of 700 psi after two hours and 1470 psi after four days.

EXAMPLE 4

| | |
|---|---|
| Component A | |
| Mono aluminum phosphate | 100 parts |
| Silica | 100 |
| Component B | |
| Trisodium phosphate - 5% solution | 30 |
| Wollastonite | 35 |
| Magnesium oxide | 35 |

-continued

| | |
|---|---|
| Silicone | 1 |

The resin has a modulus of rupture of 120 psi after two hours and 300 psi after four days.

EXAMPLE 5

| | |
|---|---|
| Component A | |
| Mono aluminum phosphate | 150 parts |
| Silica | 150 |
| Wollastonite | 23 |
| Hydrophobic fumed silica - 10% methanol slurry | 2 |
| Component B | |
| Sodium tripolyphosphate - 10% solution | 47 |
| Wollastonite | 70 |
| Magnesium oxide | 20 |
| Calcium carbonate | 5 |

This formed a cellular resin having a very uniform, fine cell structure and a density of 22.0 pounds per cubic foot. The foam rise time was one minute and foam set time two and one-half minutes.

A cellular resin was made using the same component A as Example 5, but reducing the amount of dispersing agent to 36 parts and replacing the 90 parts of wollastonite/magnesium oxide with 105 parts of magnesium oxide. The resin had a very uniform fine cell structure, a density of 23.0 pounds per cubic foot, a foam rise time of one minute and foam set time of one and one-half minutes.

EXAMPLE 7

The mono aluminum phosphate of example 5 was replaced by an equal weight of mono magnesium phosphate to form a cellular resin having a density of 23.0 pounds per cubic foot, a foam rise time of one minute and a foam set time of one and one-half minutes.

EXAMPLE 8

The mono aluminum phosphate of example 5 was replaced by an equal weight of mono magnesiu phosphate to form a cellular resin having a density of 23 pounds per cubic foot, a foam rise time of one minute and foam set time of one and one-half minutes.

EXAMPLE 9

Using the resin compositions of examples 5-8 and varying the amount of calcium carbonate blowing agent used from 0.5 to 6.0 parts produced cellular resins having densities ranging from 32 to 10 pounds per cubic foot, respectively.

EXAMPLE 10

| | |
|---|---|
| Component A | |
| Mono aluminum phosphate | 150 parts |
| Clay | 2 |
| Calcium stearate | 6 |
| Component B | |
| Sodium tripolyphosphate - 10% solution | 50 parts |
| Wollastonite | 75 |
| Magnesium | 20 |
| Calcium carbonate | 4 |
| Silicone | 1 |

The resulting cellular resin has uniform, medium sized cells and a density of 25.6 pounds per cubic foot. It has a foam rise time of two minutes and a foam set time of seven minutes. Exposure of the cellular resin to temperatures over 500° C. caused the calcium stearate to carbonize, smoke and leave a black deposit. Otherwise, the cellular resin retained its strength, nonflammability and other characteristics.

EXAMPLE 11

A series of resin compositions were made up to form cellular resins using the same components A and B of examples 5 and 7, except that the amount and type of dispersing agent added to component B were varied. The pH of each component B was measured and its effect on the density of the resulting cellular material noted. The results are tabulated below in Table 1.

TABLE 1

Effect of Component B pH on Cellular Resin Formation

| Dispersing Agent in Component B | pH of Component B | Cellular Density, lbs/ft$^3$ | |
|---|---|---|---|
| | | MAP* | MMP** |
| Sodium tripolyphosphate (10%) | 9.8 | 22.0 | 23.0 |
| Sodium hexametaphosphate (25%) | 6.9 | 22.0 | 23.0 |
| Sodium hexametaphosphate (50%) | 6.9 | 22.0 | 23.0 |
| Sodium acid pyrophosphate (10%) | 4.2 | 20.0 | 23.0 |
| Tripotassium phosphate (50%) | 11.5 | reacted with MAP* | no foam formed |

*Mono aluminum phosphate
**Mono magnesium phosphate

From these date it will be seen that the dispersing agent should be essentially nonreactive and that it should not be used to the extent that it raises the pH of component B above that which prevents the release of carbon dioxide from the calcium carbonate blowing agent.

EXAMPLE 12

A series of resin compositions were made up to form cellular resins using the same components A and B of example 5, except that the amount and type of water-repellant surfactant added to component A were varied. The effect of these variations on cell structure of the resulting resins is noted in the following Table 2.

TABLE 2

Effect of Surfactant on Cell Structure

| Surfactant | Wt. % Surfactant | Cell Struc./Sz. (inch) |
|---|---|---|
| Hydrophobic fumed silica (10%) | 0.43 | Medium to fine/<0.020 |
| Hydrophobic fumed silica (10%) | 1.0 | Ultrafine/<0.010 |
| Titanate* | 0.43 | Large/>0.060 |
| Titanate* | 1.0 | Medium to Lge./>0.040 |
| Silicone | 1.0 | Medium/>0.030 |
| Aluminum Stearate | 1.0 | Medium/<0.030 |
| Calcium Stearate | 1.0 | Medium/<0.030 |
| Calcium Stearate | 1.5 | Medium/<0.030 |
| Zinc Stearate | 1.0 | Medium/<0.030 |

*Titanate KR-55 - An allyl di-tridecyl titanium phosphite

It will be seen from these data that it is possible to predetermine and control cell size by the selection of the type of surfactant and the amount used.

EXAMPLE 13

This example illustrates the effect which the addition of a water-control agent has upon the strength and upon the moisture content of the resin formed. A first resin was made up in the manner described above using the following:

| Component A | |
|---|---|
| Mono magnesium phosphate | 100 parts |
| Silica | 100 |
| Wollastonite | 10 |
| Component B | |
| Sodium hexametaphosphate (50%) | 40 |
| Magnesium oxide | 50 |
| Silicone | 1 |

A second resin was made up in the manner described above using the following:

| Component A | |
|---|---|
| Mono aluminum phosphate | 100 parts |
| Alumina trihydrate | 100 |
| Wollastonite | 10 |
| Component B | |
| Trisodium phosphate (5%) | 24 |
| Magnesium oxide | 70 |
| Silcone | 1 |

The strengths of the resulting resins were measured and weight losses measured when they were heated to 200° C. Finally, they were heated until maximum weight loss was experienced. These data are tabulated in Table 3.

TABLE 3

Strength and Weight Losses of Resins

| | Resin | |
|---|---|---|
| Item | First | Second |
| Strength - modulus of rupture, psi | 1420 | 675 |
| Weight loss, % total weight | | |
| at 200° C. | 10 | 12 |
| maximum | 12 | 27 |
| Temperature of maximum loss, °C. | 350 | 700 |

It will be seen from these data that the alumina trihydrate present in the second formulation altered the amount of water retained in the cured resin and the temperature profile for the water removal from the resin.

EXAMPLE 14

| Component A | |
|---|---|
| Mono aluminum phosphate | 100 parts |
| Silica | 100 |
| Component B | |
| 5% Trisodium phosphate solution | 35 |
| Wollastonite (5:1 aspect ratio) | 70 |

The resin has a modulus of rupture of 225 psi after four days and a specific gravity of 1.10.

The inorganic resins formed in accordance with this invention have many uses in their noncellular and cellular forms. Because of their nonflammability and nonsmoking they may be formed into such structural configurations as panels, walls, doors, piping, ductwork and the like and used in applications where the burning of such structures is not desirable or can not be tolerated. These resins may be used as acoustical, electrical or thermal insulation. They may be used to form a poured-in-place foam, to repair cracks, to coat surfaces, and to serve as an adhesive. Unlike many organic resins, the inorganic resins of this invention are resistant to chemicals, organic and inorganic, and they are unaffected by ultraviolet radiation making them particularly suitable for outdoor use in a variety of climates. Finally, the resins of this invention are inexpensive relative to those formed of organic constituents.

It will thus be seen that the objects set forth above, among those made apparent from the preceding description, are efficiently attained, and, since certain changes may be made in carrying out the above process, in the composition set forth and in the described article without departing from the scope of the invention, it is intended that all matter contained in the above description shall be interpreted as illustrative and not in a limiting sense.

We claim:

1. A process for forming an inorganic resin comprising:
   (a) forming a liquid component A comprising an aqueous solution of mono aluminum phosphate, mono magnesium phosphate or a mixture thereof having a viscosity ranging between about 700 and about 10,000 centipoises;
   (b) forming a separate liquid component B comprising an aqueous vehicle, a phosphate-reactive wollastonite, magnesium oxide or mixtures thereof, and an essentially nonreactive phosphate dispersing agent, said component B having a viscosity permitting it to be rapidly and thoroughly mixed with component A; and
   (c) mixing said components A and B to form a slurry which reacts exothermically to set up as an inorganic resin.

2. A process in accordance with claim 1 including the step of forming said resin into a structure of predetermined size and configuration before it sets up.

3. A process in accordance with claim 2 wherein said step of forming the resin into said structure comprises molding, or extruding said resin.

4. The process of claim 3 wherein molding comprises casting.

5. A process in accordance with claim 1 wherein said component A includes an inert, low water-demand filler in an amount up to about 50% by weight of the total weight of said components A and B.

6. A process in accordance with claim 1 wherein said component A includes finely divided acicular wollastonite having an aspect ratio of at least about 10% by weight of the total weight of said components A and B.

7. A process in accordance with claim 1 wherein said component A, component B or both includes a water-repellant surfactant in a total amount between about 0.2% and 5% by weight of the total weight of said components A and B.

8. A process in accordance with claim 1 wherein the amount of said aqueous solution of component A ranges between about 20% and about 70% by weight of the total weight of components A and B.

9. A process in accordance with claim 1 wherein said component A has a solids content ranging between about 20 and about 70 weight percent.

10. A process in accordance with claim 1 wherein said reactive wollastonite is a finely divided acicular wollastonite material having an aspect ratio of less than about 10:1 and a surface area of at least about 1.0 m²/gm and is present in said components A and B.

11. A process in accordance with claim 1 wherein said non-reacting dispersing agent of said component B is a polyphosphate in an aqueous solution.

12. A process in accordance with claim 1 wherein at least one of said components A or B includes a water-repellant surfactant; wherein said component B includes a blowing agent capable of releasing a gas by reaction, decomposition or vaporization in said slurry; and wherein said dispersing agent is one which does not raise the pH of said slurry above 10, whereby, when said components A and B are mixed, said blowing agent releases said gas to cause said slurry to set up into a cellular inorganic resin.

13. A process in accordance with claim 12 wherein said blowing agent is calcium carbonate in an amount ranging between about 0.2% and about 15% by weight of the total weight of components A and B.

14. A process in accordance with claim 12 wherein said blowing agent is calcium carbonate in an amount ranging between about 0.25 and about 15% by weight of the total weight of components A and B.

15. A process in accordance with claim 1 wherein at least one of said components A or B includes a water-repellant surfactant and said process includes the step of introducing and inert gas under pressure into said slurry during said mixing step thereby causing said slurry to set-up as a cellular inorganic resin.

16. A process in accordance with claim 1 wherein the weight ratio of said mono aluminum phosphate, mono magnesium phosphate or mixture thereof of component A to said phosphate-reactive constituent of component B ranges between about 50/50 and about 65/35.

17. A process in accordance with clalim 1 including the step of adjusting and maintaining the temperatures of components A and B to 15.5° C. or lower prior to said step of mixing.

18. A method of manufacturing a resin cement having extended shelf life comprising adjusting the viscosity of an aqueous solution of mono aluminum phosphate, mono magnesium phosphate or mixtures thereof to a viscosity of about 700 to about 10,000 centipoises, to form component A;
combining wollastonite and/or magnesium oxide with an aqueous phosphate dispersing agent essentially unreactive with component A to form component B in essentially dry form and maintaining component B separated from component A to obtain a desired shelf life until immediately prior to use; and
adding water to component B and combining components A and B to form said resin cement by reaction.

19. A method of manufacturing a resin article comprising:
mixing two components A and B to form a mixture undergoing exothermic reaction;
directing the mixture toward a support surface capable of supporting said mixture until the reaction is completed; wherein component A comprises an aqueous solution of mono aluminum phosphate, mono magnesium phosphate or mixtures thereof having a viscosity ranging between about 700 and about 10,000 centipoises; and wherein component B comprises an aqueous vehicle; a phosphate-reactive constituent comprising wollastonite, magnesium oxide or mixtures thereof, and an essentially nonreactive aqueous phosphate dispersing agent; said component B having a viscosity permitting it to be rapidly and thoroughly mixed with component A, thereby to form a slurry which reacts exothermically to form an inorganic resin article on said support surface.

20. The method of claim 19 wherein said support surface comprises a fiberglass mat and said mixture impregnates at least an upper surface of said mat to form a fiber-reinforced article.

21. The method of claim 2 wherein said support surface comprises a fiberboard and said resin cement adheres to said fiberboard to form a composite article.

22. The product made by the process of claim 20.

23. The product made by the process of claim 21.

24. A two-component system for mixing to form an inorganic resin, comprising
(a) a liquid component A comprising an aqueous solution of mono aluminum phosphate, mono magnesium phosphate or mixtures thereof having a viscosity ranging between about 700 and about 10,000 centipoises; and
(b) a liquid component B comprising an aqueous vehicle; a phosphate-reactive constituent comprising wollastonite, magnesium oxide or mixtures thereof, and an essentially nonreactive phosphate dispersing agent; said component B having a viscosity permitting it to be rapidly and thoroughly mixed with component A, thereby to form a slurry which reacts exothermically to form an inorganic resin.

25. A two-component system in accordance with claim 24 wherein said component A includes an inert, low water-demand filler in an amount up to about 50% by weight of the total weight of said components A and B.

26. A two-component system in accordance with claim 25 wherein said inert filler is silica.

27. A two-component system in accordance with claim 25 wherein at least a portion of said filler comprises preformed cellular material.

28. A two-component system in accordance with claim 25 wherein at least a portion of said filler comprises a finely divided, chemically hydrated water releasing agent.

29. A two-component system in accordance with claim 24 wherein said component A includes wollastonite substantially unreactive with said mono aluminum phosphate or said mono magnesium phosphate over the time required to formulate said component A and to mix it with said component B, the quantity of said unreactive wollastonite amounting up to about 10% by weight of the total weight of said components A and B.

30. A two-component system in accordance with claim 29 wherein said substantially unreactive wollastonite is further characterized as being a finely divided acicular material having an aspect ratio of at least about 15:1 and a surface area of less than about 1.0 m²/gm.

31. A two-component system in accordance with claim 24 wherein said component A, component B, or both includes a water-repellent surfactant in a total amount between about 0.2% and about 5% by weight of the total weight of said components A and B.

32. A two component system in accordance with claim 31 wherein said water-repellant surfactant is a hydrophobic fumed silica, a titanate, a silicone, a wax, or a stearate.

33. A two component system in accordance with claim 32 wherein said water-repellant surfactant is a hydrophobic fumed silica.

34. A two-component system in accordance with claim 24 wherein said aqueous solution includes mono aluminum phosphate and has a solids content ranging between about 20 and about 70 weight percent.

35. A two-component system in accordance with claim 24 wherein said aqueous solution includes mono magnesium phosphate, and has a solids content ranging between about 20 and about 70 weight percent.

36. A two-component system in accordance with claim 24 wherein the amount of said aqueous solution of component A ranges between about 20% and about 70% by weight of the total weight of components A and B.

37. A two-component system in accordance with claim 24 wherein said reactive wollastonite is a finely divided acicular wollastonite having as aspect ratio of less than about 10:1 and a surface area of at least about 1.0 m$^2$/gm and is present in said component B in an amount of up to about 40% by weight of the total weight of said components A and B.

38. A two-component system in accordance with claim 24 wherein said non-reacting dispersing agent of said component B is a polyphosphate in an aqueous solution.

39. A two-component system in accordance with claim 24 suitable for forming a cellular resin wherein said component A or component B or both includes a water-repellant surfactant; wherein said component B includes a blowing agent capable of releasing a gas by reaction, decomposition or vaporization in said slurry; and wherein said dispersing agent in one which does not raise the pH of said slurry above about 10.

40. A two-component system in accordance with claim 39 wherein said blowing agent is calcium carbonate in an amount ranging between about 0.2% and about 15% by weight of the total weight of said components A and B.

41. two-component system in accordance with claim 24 wherein the weight ratio of said aqueous solution of component A to said phosphate reactive constituent of component B ranges between about 50/50 and about 65/35.

42. A two-component system in accordance with claim 24 wherein the weight ratio of said mono aluminum phosphate-reactive constituent of component B ranges between about 20/80 and about 70/30.

43. A two-component sytem in accordance with claim 24 wherein said component A includes up to about 50% by total weight of components A and B of an inert, low-water demand filler, up to about 10% by weight of wollastonite substantially unreactive with said mono aluminum phosphate or said mono magnesium phosphate, and up to about 5% by weight of a water-repellent surfactant.

44. A two-component system in accordance with claim 43 wherein component B includes up to about 15% by weight of a blowing agent capable of releasing a gas by reaction, decomposition or vaporization in said slurry, said blowing agent being one which does not raise the pH of said slurry above about 10.

45. A two-component system in accordance with claim 43 wherein the amount of said aqueous solution of component A ranges between about 20% and about 70% by weight of the total weight of said components A and B; said aqueous solutiuon of mono aluminum phosphate has a solids content ranging between about 20 and about 70 weight percent; and said aqueous solution of mono magnesium phosphate has a solids content ranging between about 20 and about 70 weight percent.

46. An inorganic resin formed by the reaction upon mixing of a liquid component A comprising an aqueous solution of mono aluminum phosphate, mono magnesium phosphate or a mixture thereof with a liquid component B comprising a phosphate-reactive, finely divided, acicular wollastonite having an aspect ration of lower than about 10:1, magnesium oxide, or mixtures thereof and an essentially nonreactive aqueous phosphate dispersing agent.

47. An inorganic resin in accordance with claim 46 including a low water-demand filler.

48. An inorganic resin in accordance with claim 47 wherein said filler is silica added in component A.

49. An inorganic resin in accordance with claim 46 including finely divided acicular wollastonite having an aspect ratio of about 5:1 in component B.

50. An inorganic resin in accordance with claim 46 including wollastontie having an aspect ratio of at least 15:1 from component A and wollastonite having an aspect ratio of less than 10:1 in component B.

51. An inorganic resin in accordance with claim 46 including wollastonite having an aspect ratio of at least 15:1 from component A and wollastonite having an aspect ratio of less than 10:1 in component B.

52. An inorganic resin in accordance with claim 46 wherein the amount of said aqueous solution of component A has a solids content ranging between about 20 and about 70 weight percent.

53. An inorganic resin in accordance with claim 46 in cellular form.

54. An inorganic resin in accordance with claim 53 wherein the cells of said resin are formed by adding a surfactant to component A or B, and a blowing agent to component B.

55. An inorganic resin in accordance with claim 54 wherein said surfactant is fumed hydrophobic silica and said blowing agent is calcium carbonate.

56. An inorganic resin in accordance with claim 53 wherein the cells of said resin are formed by introducing an inert gas under pressure during said mixing of components A and B.

57. An inorganic resin in accordance with claim 53 wherein the cells of said resin range from ultrafine to medium in size.

58. A resin cement composition comprising mono aluminum phosphate, mono magnesium phosphate, or mixtures thereof; magnesium oxide and an essentially nonreactive aqueous phosphate dispersing agent.

59. The composition of claim 58 further including a phosphate reactive wollastonite.

60. The composition of claim 59 wherein said phosphate comprises mono aluminum phosphate and the dispersing agent is selected from the group consisting of sodium tripolyphosphate, sodium hexa-metaphosphate, sodium acid pyrophosphate, and mixtures thereof.

61. The compositions of claim 60 wherein said phosphate is mono magnesium phosphate and the dispersing agent is selected from the group consisting of dipotassium phosphate, tripotassium phosphate, tripolyphosphate, tetrapotassium phosphate, and mixtures thereof.

* * * * *

UNITED STATES PATENT AND TRADEMARK OFFICE
CERTIFICATE OF CORRECTION

PATENT NO. : 4,504,555
DATED : March 12, 1985
INVENTOR(S) : William L. Prior and William C. Sargeant It is certified that error appears in the above-identified patent and that said Letters Patent are hereby corrected as shown below:

Column 15, line 30, "and" should be --an--

Column 15, line 38, "clalim" should be --claim--

Column 16, line 14, "2" should be --19--

Column 18, line 13, "ration" should be --ratio--

Column 17, line 36, "in" should be --is--

Signed and Sealed this

Sixth Day of May 1986

[SEAL]

Attest:

DONALD J. QUIGG

Attesting Officer

Commissioner of Patents and Trademarks